United States Patent [19]
Pernet

[11] Patent Number: 5,169,345
[45] Date of Patent: Dec. 8, 1992

[54] CONTACT FRAME FOR AN I.C. CARD READER

[75] Inventor: Michel Pernet, Doubs, France

[73] Assignee: Alcatel Cit, Paris, France

[21] Appl. No.: 793,944

[22] Filed: Oct. 22, 1991

[30] Foreign Application Priority Data

Oct. 25, 1990 [FR] France ............... 90 13245

[51] Int. Cl.⁵ .................................. H01R 13/00
[52] U.S. Cl. ....................................... 439/630
[58] Field of Search ..................... 439/629–637

[56] References Cited

U.S. PATENT DOCUMENTS

| | | | |
|---|---|---|---|
| 4,665,614 | 5/1987 | Stipanuk et al. | 439/630 |
| 4,900,272 | 2/1990 | Lange et al. | 439/630 |
| 4,900,273 | 2/1990 | Pernet | 439/630 |
| 5,013,255 | 5/1991 | Juuret et al. | 439/630 |

FOREIGN PATENT DOCUMENTS

| | | |
|---|---|---|
| 0213041 | 3/1988 | European Pat. Off. . |
| 0274288 | 7/1988 | European Pat. Off. . |
| 2554977 | 5/1985 | France . |
| 2592193 | 6/1987 | France . |

*Primary Examiner*—Joseph H. McGlynn
*Attorney, Agent, or Firm*—Sughrue, Mion, Zinn, Macpeak & Seas

[57] ABSTRACT

The invention relates to a contact frame for an I.C. card reader. The contact frame includes in particular a frame member of insulating material provided with at least two windows together with contact elements constituted by two sets of blades, namely a "front" set and a "rear" set. The blades of the rear set are embedded in a rear bar of the frame member delimiting the rear window, and their connection pin forming ends project from the rear bar. The blades in the front set have their connection pin forming ends projecting from the rear of the frame member in the vicinity of the connection pins of the rear set.

9 Claims, 3 Drawing Sheets

CONTACT FRAME FOR AN I.C. CARD READER

The present invention relates to a contact frame for an I.C card reader. The term "I.C card" is used to cover cards that include at least one electronic component with which electrical connections need to be established in a reader fitted to apparatus that is operated by means of a card of this kind. Such equipments are becoming more and more widespread, for example as bank terminals or as payphones.

BACKGROUND OF THE INVENTION

One such contact frame constitutes the subject matter of French patent No. 2 623 313 (see also U.S. Pat. No. 4 900 272).

According to that patent, the contact frame includes, in particular, card guide means and contact elements which provide electrical connections with conducting tabs on the I.C. card and via which circuits are established for the benefit of the apparatus including the I.C card reader.

Such a frame essentially comprises a piece made of molded insulating plastic supporting the contact elements which are installed in connection windows by being embedded in the bars of the frame. The frame supports two series of contact elements disposed facing each other. Towards the middle of the frame, these elements are shaped to project beneath the plane surface of the frame. It is these shaped portions that rest against the electronic component of the I.C card and consequently establish contact.

At either side of the frame, the contact elements project outwards from the window bars in which they are embedded to form connection pins for connection to a printed circuit board.

In general, such a frame is associated with a cover which is installed beneath the frame, the cover and the frame forming a housing into which the I.C card is inserted.

This frame and cover assembly is generally mounted beneath the printed circuit board. The shaped portions of the connection elements therefore extend downwards and the contact elements at their ends forming connection pins are folded upwards to be soldered to the printed circuit board.

If the term "front" is used for that side of the frame which is closest to the I.C card insertion slot and the term "rear" for the opposite side of the frame, then one series of connection pins is at the front of the frame and the other series is at the rear of the frame. Outside the molded insulating material, between leaving the bar of the frame and being connected in or on the printed circuit board, each bare pin therefore forms a bend.

Such an arrangement poses several problems.

Since the printed circuit board is on top above the contact frame, the insertion slot through the housing of the apparatus must be at a distance from the top lid of the housing, which distance is defined by the room taken up by the printed circuit board which may possibly have bulky components on its top surface. Unfortunately, it is preferably to leave room inside the housing beneath the I.C card connector, and for ergonomic reasons to place the insertion slot as high as possible relative to the housing of the apparatus in order to facilitate handling by the user.

In addition, the printed circuit board may need to be connected to a device situated beneath the I.C card connector, which device may be constituted by a keyboard, for example. The presence of the I.C card connector beneath the printed circuit board does not facilitate making such a connection, if required.

In addition, as mentioned above, the prior art arrangement has bent portions of the connection pins which are bare at the front of the frame close to the insertion slot. Having these bent portions at the front presents several problems.

When I.C cards are electrostatically charged, discharges may take place, given the short distance between the I.C card and the bent portions of the front connection pins. Thus, static electricity may give rise to errors or damage in the reader system.

In addition, the bent portions of the connection pins are close to the insertion slot for the I.C card, and it is relatively easy to damage these connection pins by means of a tool such as a screwdriver blade or the like, and this arrangement is thus relatively fragile if such acts of vandalism are performed.

Further, it is also possible to connect wires to these portions of the connection pins close to the insertion slot, thus making it possible to simulate the circuits of the I.C card and thus use the apparatus fraudulently.

The present invention seeks to solve these problems by providing a contact frame arrangement for the reader of an I.C card that enables the printed circuit board to be installed beneath the contact frame and cover assembly, while still enabling the I.C card to be inserted conventionally, i.e. with its contact zone facing upwards.

European patent document EP-O 213 041 filed Aug. 8, 1986 discloses a contact frame in which the ends of the blades that form connection pins terminate on one side of the frame opposite to their contact ends. These blades are embedded in plates which engage on studs carried by the support frame and they are locked in place by forming heads on these studs, with the plates in the two sets of blades being superposed.

That frame suffers from numerous technical problems which, in particular, make it particularly expensive to implement.

To make such a frame, a large number of pieces need to be assembled, and these pieces are all very small, making them difficult to manufacture and to assemble.

An I.C card must be positioned very accurately relative to the contact ends in order to obtain a proper force exerted on the conducting tabs of the I.C card so as to avoid problems of contact resistance or problems of wear on the contact elements and on the cards. Given the that the plates are stacked on the prior frame, tolerances are added together and this means that very tight tolerances are required on each of the stacked-together pieces.

In addition, to manufacture that frame, it is necessary to provide two different types of blade, to perform two overmolding operations, and to perform meticulous assembly with the support frame, which itself must also be shaped.

Finally, the space occupied in the thickness direction by such a contact frame is particularly large. However, it is desirable of an I.C card reader to be as compact as possible, for example in order to make portable apparatuses.

SUMMARY OF THE INVENTION

The present invention provides a contact frame for an I.C card reader, the frame comprising in particular a frame of insulating material provided with at least two windows and with contact elements, the contact elements being constituted by two sets of blades, a "front" set for placing on the side of the frame adjacent to the I.C card insertion slot, and a "rear" set for placing on the other side, the blades in each set being parallel, and being shaped at one of their ends, with the shaped ends projecting downwards beneath the plane surface of the frame to provide electrical connection with conducting tabs on the I.C card, the shaped ends of each set being disposed in a respective one of the windows and facing the shaped ends of the other set, the other ends of the blades being for forming connection pins for connection to a printed circuit board associated with the frame, the blades of the rear set being embedded in a rear bar delimiting the rear window, their connection pin forming ends projecting from said bar, and the blades of the front set being embedded at least in a front bar delimiting the front window, wherein the blades of the front set have their pin-forming ends projecting from the rear of the frame of insulating material from a side face of the frame in the vicinity of the connection pins of the rear set, all of the connection pins lying substantially in the same plane.

Such a frame can be installed conventionally with the printed circuit board disposed above it, or in the novel manner with the printed circuit board beneath it.

Whichever way it is installed, the bare portions of the blades close to the I.C card insertion slot are eliminated, thus avoiding them being subjected to acts of vandalism or to fraudulent connections. Any problems concerning the presence of static electricity are also avoided at this point in the connector.

Because of these characteristics, all of the connection pins lie on the same side of the contact frame. The frame may thus be associated very easily with a printed circuit board disposed beneath the assembly of the contact frame and the cover.

In addition, the frame of the invention has minimum overall thickness, and is particularly adapted to a wide range of I.C card reader applications.

A preferred embodiment consists in the blades of the front set, when viewed perpendicularly to the plane of the frame, being cut out in gallows-shapes, with the shorter branches thereof constituting the shaped portions for making electrical contact and with the longer branches thereof being disposed parallel to the blades of the rear set.

Preferably the connection pins of the front set and of the rear set are folded downwards in identical manner.

This arrangement makes it possible to install the frame on a printed circuit board disposed beneath the assembly of the contact frame and its cover.

In a preferred embodiment, the blades in the front set are embedded at least in a front bar delimiting the front window; they are preferably also embedded in a central bar separating the front and rear windows, and in a rear bar delimiting the rear window.

In a preferred arrangement, the blades in the front set are symmetrical about a central axis passing through both windows.

This makes it possible to reduce the space taken up widthwise in the front bar defining the front window, the blades in the front set that are furthest to the right being extended to the right and the blades that are to the left being extended to the left.

In order to prevent any harmful electrical discharge in the vicinity of the I.C insertion slot, the front face of the frame may include a conductive coating connected to ground.

In a preferred manufacturing method that is particularly advantageous, the front and rear sets of blades are made by being cut out as a single piece from a strip of metal.

Such a manufacturing method requires only one cutting-out operation to obtain all of the blades together, and only one overmolding operation for both sets of blades when making the contact frame. Adjustment and positioning operations are thus simplified in the extreme. This manufacturing method is particularly advantageous with respect to cost.

BRIEF DESCRIPTION OF THE DRAWINGS

An embodiment of the invention is described by way of example with reference to the accompanying drawings, in which.

DETAILED DESCRIPTION

Figure 1:
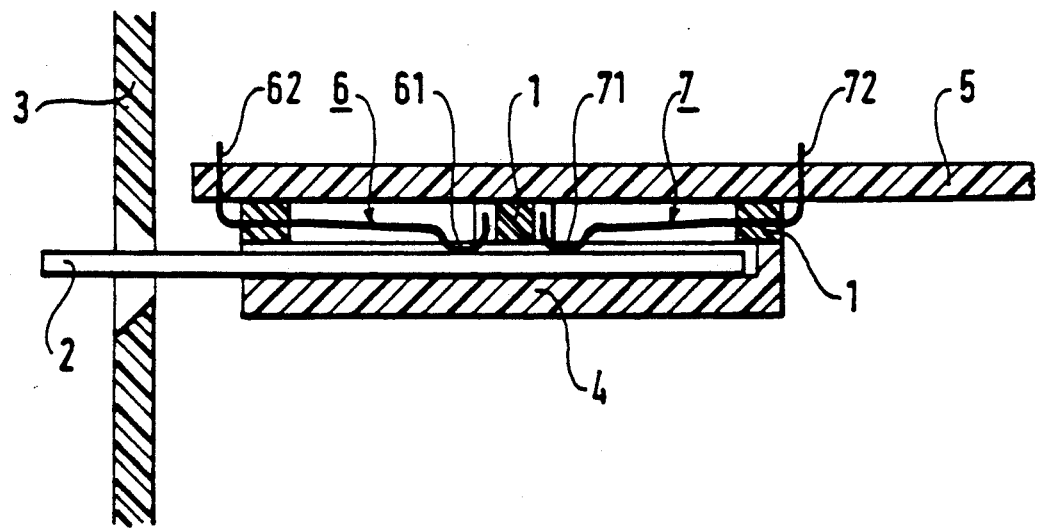
FIG. 1 is a section view through a prior art I.C card connector arrangement, with an I.C card being shown inserted in the connector.

FIG. 1 shows the prior art connector arrangement. In that arrangement, the printed circuit board 5 is disposed above the connector which is constituted by a contact frame member 1 having a front and a rear, and a cover 4. The I.C card 2 is inserted via the insertion slot 3 of the apparatus housing with the contact zone of the card facing upwards, and the contact zone makes electrical connection with shaped portions 61 and 71 of the blades in a front set of blades 6 and in a rear set 7. These blades are embedded in part in the contact frame 1 and their opposite ends are terminated by front and rear connection pins 62 and 72.

With a contact frame arranged in this way, it is not possible to place the printed circuit board beneath the connector since it would not be possible to connect the front connection pins 62 to the printed circuit board 5. In addition, as can be seen in the figure, the front connection pins 62 have bent portions that are close to the insertion slot and are consequently liable to be damaged or to be manipulated fraudulently.

The present invention solves these problems by providing an arrangement as described with reference to FIG. 2.

In this arrangement, the relative disposition of the contact frame member 1 and the cover 4 is unchanged so that it continues to be possible to insert the I.C. card 2 with its contact zone facing upwards.

In contrast, the printed circuit board 5 is disposed beneath this assembly, thus making it possible to reduce the space occupied above the connector.

To do this, the invention proposes a novel arrangement of the contact frame 1, as described in greater detail below.

The shaped portions 61 and 71 in the front and rear sets of blades 6 and 7 retain the same disposition in order to make contact with the contact zone of the I.C. card.

In contrast, the connection pins 62 and 72 of both sets of blades are at the rear of the frame member 1 and project into the side face thereof, with all of the connection pins 62 and 72 lying substantially in the same plane.

Figure 3:
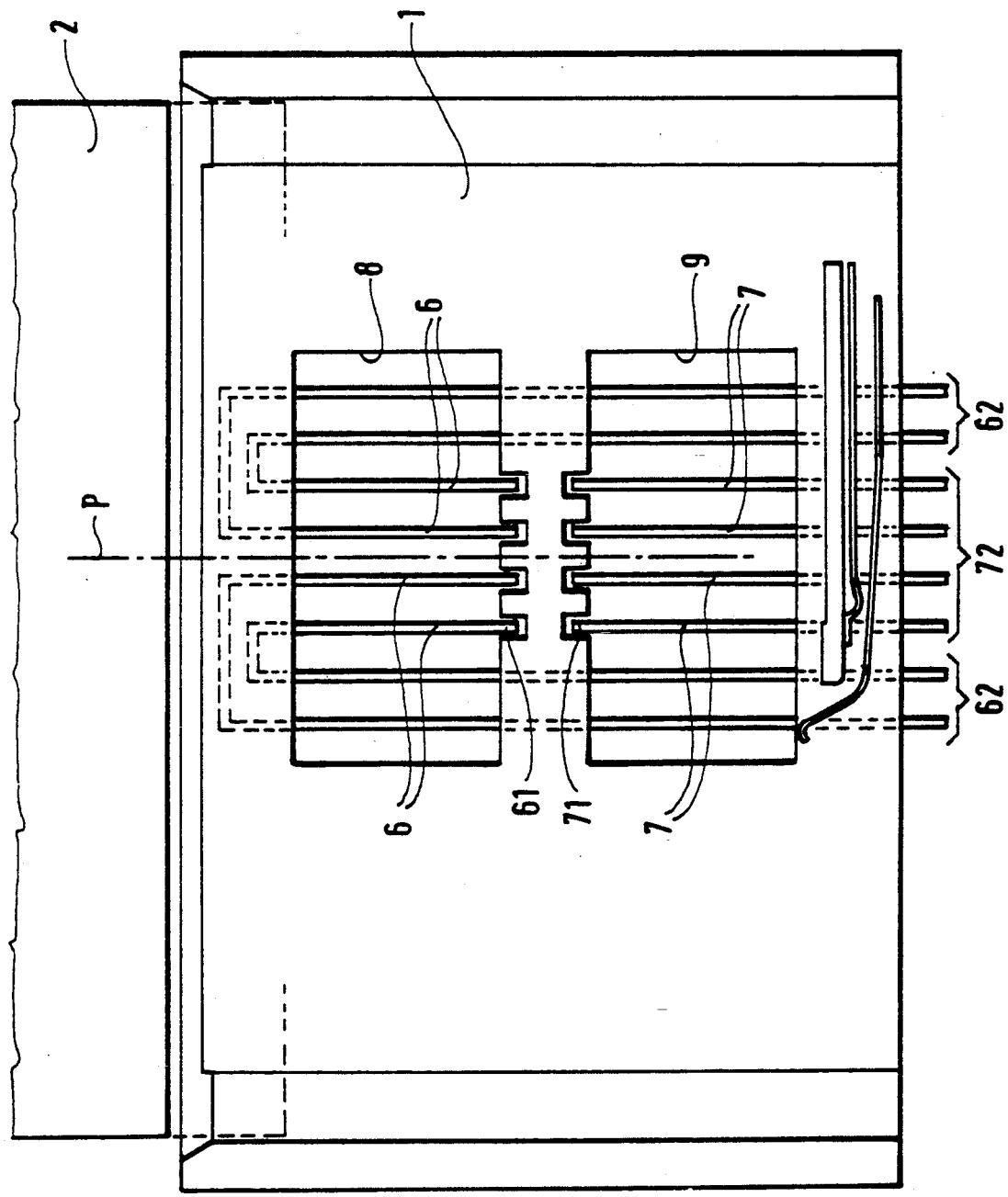
FIG. 3 is a view from below of a contact frame in accordance with the invention.

This new arrangement is described below with reference to FIG. 3 which is a view of the contact frame of the invention as seen from below.

In conventional manner, the contact frame member 1 includes a plate of insulating plastic having openings therein to a greater or lesser extent, and in particular including two windows 8 and 9 disposed facing the shaped connection portions 61 and 71 of the front and rear sets of blades 6 and 7.

These shaped portions 61 and 71 are received in notches formed in the bar of plastic separating the two windows 8 and 9.

The contact frame 1 is also provided with an end-of-stroke contact and with an end-of-stroke abutment, in conventional manner.

The subject matter of the invention lies in the way the blades in the front and rear sets 6 and 7 are arranged. In the example shown, each set of blades comprises four blades: it would naturally be possible to adapt the arrangement in accordance with the present invention to some other number of blades.

The blades of the rear set 7 as seen from below are rectilinear and their shaped ends 71 are disposed in the rear window 9. Their opposite ends project from a rear bar delimiting the rear window 9 and they form connection pins 72 for connection to the printed circuit board. They have intermediate portions that are embedded in the said bar by overmolding.

The blades of the front set 6 are disposed in similar manner with respect to their shaped connection portions 61 in the front window 8.

However, when seen from below, they extend beyond said shaped portions 61 in a manner that is not rectilinear. As can be seen in the figure, they have a gallows-shape ( ), with the shorter branch of the gallows-shape forming said shaped portions 61. The blades are thus extended by a portion having two right angle bends and then by a rectilinear portion which is adjacent and parallel to the shaped portion 61 and then adjacent and parallel to the blades in the rear set 7, finally forming connection pins 62 adjacent to the connection pins 72 of the rear set 7.

Figure 2:
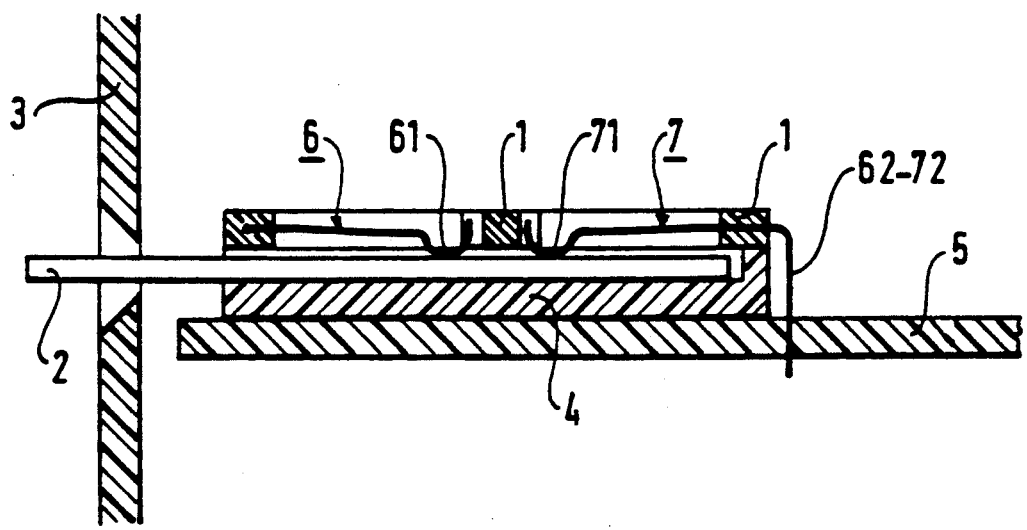
FIG. 2 is a section view of an I.C card connector arrangement in accordance with the invention, with an I.C card being shown inserted in the connector.

In this position, all of the connection pins 62 and 72 are folded upwards in the underside view so that they point downwards once the connector has been assembled (FIG. 2).

Apart from the shaped connection portions 61 and the connection pins 62, the blades in the front set 6 may be totally embedded. In which case (not shown), the windows 8 and 9 are narrower, with window width corresponding only to the width required by the shaped portions 61 and 71.

In the preferred arrangement as shown the blades of the front set 6 are embedded only in the front bar defining the front window 8, in the bar delimiting the front and rear windows 8 and 9, and in the rear bar defining the rear window 9.

To minimize the width occupied by the front bar defining the front window 8, the blades in the front set 6 that are on the right are extended towards the right while the blades that are on the left are extended towards the left. In other words, the gallows-shaped blades are disposed symmetrically about a central axis of symmetry P-P passing through both windows 8 and 9.

Figure 4:
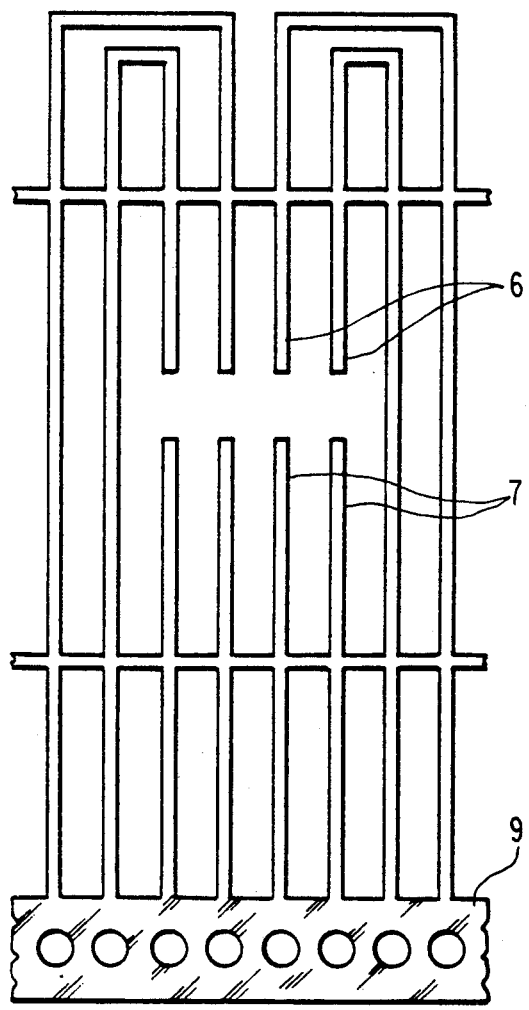
FIG. 4 is a plan view of a metal strip from which the front and rear sets of blades are cut out.

The front and rear sets of blades are made by being cut out as a single piece from a strip 9 of metal, FIG. 4. To hold the blades properly relative to one another, one or two supporting bridges are provided transversely thereto, with these bridges being cut away after the blades have been embedded in the plate of insulating plastic of the contact frame.

Because of the way the contact frame is arranged, it is possible, optionally, to place an electrostatic discharge device on the front face of the resulting connector, thereby eliminating any discharge caused by any static electricity that may be found on the I.C. card. Such a device may be constituted by a conductive coating deposited on a portion of the front face of the contact frame member and connected to ground.

I claim:

1. In a contact frame for an I.C. card reader, said frame comprising a frame member of insulating material having a front and rear and defining a principal longitudinal plane and being provided with at least two windows and contact elements, said contact elements being constituted by two sets of blades consisting of a front set of blades for placing on the front of the frame member adjacent to an I.C. card insertion slot, and a rear set of blades for placing on the rear of the frame member, the blades in each set being parallel, and being shaped at one of their ends, with the shaped ends projecting downwards beneath the principal longitudinal plane of the frame member to provide electrical connections with conducting tabs on the I.C. card, the shaped ends of each set being disposed in a respective one of the windows and facing the shaped ends of the other set, the other ends of the blades forming connection pins for connection to a printed circuit board associated with the frame, the blades of the rear set being embedded in a rear bar of the frame member delimiting the rear window and having connection pin forming ends projecting from said rear bar, and the blades of the front set being embedded at least in a front bar of said frame member delimiting the front window, the improvement wherein the blades of the front set have their pin-forming ends projecting from the rear of the frame member in the vicinity of the connection pins of the rear set, and all of the connection pins lying substantially in the same plane.

2. A frame according to claim 1, wherein the connection pins of the front set and of the rear set are folded downwards in identical manner.

3. A frame according to claim 1, wherein a front face of said frame member includes a conductive coating connected to ground.

4. A method of manufacturing a frame according to claim 1, wherein the front and rear sets of blades are made by being cut out together as a single piece from a strip of metal.

5. A frame according to claim 1, wherein the blades of the front set when viewed perpendicularly to the principal longitudinal plane of the frame member, are of gallows-shape with long and short parallel branches, and with the short branches thereof constituting the shaped portions for making electrical contact, and with the long branches thereof being disposed parallel to the blades of the rear set.

6. A frame according to claim 5, wherein the blades of the front set are embedded in a rear bar of said frame member delimiting the rear window.

7. A frame according to claim 5, wherein the blades of the front set are symmetrical about a central axis PP passing through both windows.

8. A frame according to claim 1, wherein the blades of the front set are embedded in a central bar of said frame member separating the front and rear windows.

9. A frame according to claim 8, wherein the blades of the front set are embedded in a rear bar of said frame member delimiting the rear window.

* * * * *